United States Patent
Haven

(10) Patent No.: US 9,038,074 B2
(45) Date of Patent: May 19, 2015

(54) SYSTEM, METHOD AND COMPUTER PROGRAM PRODUCT FOR RECURSIVELY EXECUTING A PROCESS CONTROL OPERATION TO USE AN ORDERED LIST OF TAGS TO INITIATE CORRESPONDING FUNCTIONAL OPERATIONS

(75) Inventor: Richard Haven, Daly City, CA (US)

(73) Assignee: salesforce.com, inc., San Francisco, CA (US)

( * ) Notice: Subject to any disclaimer, the term of this patent is extended or adjusted under 35 U.S.C. 154(b) by 220 days.

(21) Appl. No.: 13/472,370

(22) Filed: May 15, 2012

(65) Prior Publication Data

US 2013/0086591 A1 Apr. 4, 2013

Related U.S. Application Data

(60) Provisional application No. 61/543,171, filed on Oct. 4, 2011.

(51) Int. Cl.
G06F 9/46 (2006.01)
G06F 7/38 (2006.01)
G06F 9/44 (2006.01)

(52) U.S. Cl.
CPC ........................................ *G06F 9/44* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |

(Continued)

*Primary Examiner* — Meng An
*Assistant Examiner* — Bing Zhao
(74) *Attorney, Agent, or Firm* — Zilka-Kotab, PC

(57) ABSTRACT

In accordance with embodiments, there are provided mechanisms and methods for controlling a process using a process map. These mechanisms and methods for controlling a process using a process map can enable process operations to execute in order without necessarily having knowledge of one another. The ability to provide the process map can avoid a requirement that the operations themselves be programmed to follow a particular sequence, as can further improve the ease by which the sequence of operations may be changed.

16 Claims, 6 Drawing Sheets

(56) References Cited

U.S. PATENT DOCUMENTS

| | | | |
|---|---|---|---|
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker et al. |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,062,502 | B1 | 6/2006 | Kesler |
| 7,181,758 | B1 | 2/2007 | Chan |
| 7,289,976 | B2 | 10/2007 | Kihneman et al. |
| 7,340,411 | B2 | 3/2008 | Cook |
| 7,356,482 | B2 | 4/2008 | Frankland et al. |
| 7,401,094 | B1 | 7/2008 | Kesler |
| 7,412,455 | B2 | 8/2008 | Dillon |
| 7,508,789 | B2 | 3/2009 | Chan |
| 7,620,655 | B2 | 11/2009 | Larsson et al. |
| 7,698,160 | B2 | 4/2010 | Beaven et al. |
| 7,730,478 | B2 | 6/2010 | Weissman |
| 7,779,039 | B2 | 8/2010 | Weissman et al. |
| 8,015,495 | B2 | 9/2011 | Achacoso et al. |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,275,836 | B2 | 9/2012 | Beaven et al. |
| 8,457,545 | B2 | 6/2013 | Chan |
| 8,484,111 | B2 | 7/2013 | Frankland et al. |
| 2001/0044791 | A1 | 11/2001 | Richter et al. |
| 2002/0022986 | A1 | 2/2002 | Coker et al. |
| 2002/0029161 | A1 | 3/2002 | Brodersen et al. |
| 2002/0029376 | A1 | 3/2002 | Ambrose et al. |
| 2002/0035577 | A1 | 3/2002 | Brodersen et al. |
| 2002/0042264 | A1 | 4/2002 | Kim |
| 2002/0042843 | A1 | 4/2002 | Diec |
| 2002/0072951 | A1 | 6/2002 | Lee et al. |
| 2002/0082892 | A1 | 6/2002 | Raffel et al. |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0162090 | A1 | 10/2002 | Parnell et al. |
| 2002/0165742 | A1 | 11/2002 | Robins |
| 2003/0004971 | A1 | 1/2003 | Gong et al. |
| 2003/0018705 | A1 | 1/2003 | Chen et al. |
| 2003/0018830 | A1 | 1/2003 | Chen et al. |
| 2003/0066031 | A1 | 4/2003 | Laane |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan, Jr. et al. |
| 2004/0199489 | A1 | 10/2004 | Barnes-Leon et al. |
| 2004/0199536 | A1 | 10/2004 | Barnes Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2006/0021019 | A1 | 1/2006 | Hinton et al. |
| 2008/0249972 | A1 | 10/2008 | Dillon |
| 2009/0063415 | A1 | 3/2009 | Chatfield et al. |
| 2009/0100342 | A1 | 4/2009 | Jakobson |
| 2009/0177744 | A1 | 7/2009 | Marlow et al. |
| 2011/0239126 | A1* | 9/2011 | Erickson et al. ............... 715/744 |
| 2012/0167092 | A1* | 6/2012 | Delchev et al. ............... 718/100 |
| 2013/0218948 | A1 | 8/2013 | Jakobson |
| 2013/0218949 | A1 | 8/2013 | Jakobson |
| 2013/0218966 | A1 | 8/2013 | Jakobson |
| 2014/0359537 | A1 | 12/2014 | Jackobson et al. |
| 2015/0006289 | A1 | 1/2015 | Jakobson et al. |
| 2015/0007050 | A1 | 1/2015 | Jakobson et al. |

\* cited by examiner

SYSTEM, METHOD AND COMPUTER PROGRAM PRODUCT FOR RECURSIVELY EXECUTING A PROCESS CONTROL OPERATION TO USE AN ORDERED LIST OF TAGS TO INITIATE CORRESPONDING FUNCTIONAL OPERATIONS

CLAIM OF PRIORITY

This application claims the benefit of U.S. Provisional Patent Application 61/543,171 entitled "Methods and Systems for Managing a Sequence of Asynchronous Operations," by Richard Haven, filed Oct. 4, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to execution of processes involving multiple sequential operations.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Traditionally, execution of a process involving multiple sequential operations has required the operations to have knowledge of the sequence in which they are to be executed. In particular, each operation must have knowledge of the operation previous thereto. In order for an operation to know when to begin execution, the operation must then listen for the previous operation to identify when such previous operation is complete. Unfortunately, this technique for executing a process is limited, including for example the requirement that the operations involved in the process have knowledge of each other and further the requirement that the operations listen for one another.

Accordingly, it is desirable to provide techniques enabling process operations to execute in order without necessarily having knowledge of one another, to avoid programming the operations themselves to follow a particular sequence, as well as improving the ease by which the sequence of operations may be changed.

BRIEF SUMMARY

In accordance with embodiments, there are provided mechanisms and methods for controlling a process using a process map. These mechanisms and methods for controlling a process using a process map can enable process operations to execute in order without necessarily having knowledge of one another. The ability of embodiments to provide the process map can avoid a requirement that the operations themselves be programmed to follow a particular sequence, as can further improve the ease by which the sequence of operations may be changed.

In an embodiment and by way of example, a method for controlling a process using a process map is provided. In use, for a process, a process map is identified that maps each tag in an ordered list of tags to a different functional operation included in the process. Furthermore, a process control operation is recursively executed to use the ordered list of tags to initiate the functional operations.

While one or more implementations and techniques are described with reference to an embodiment in which controlling a process using a process map is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for controlling a process using a process map.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in ado/abase system.

Next, mechanisms and methods for providing controlling a process using a process map will be described with reference to example embodiments.

Figure 1:
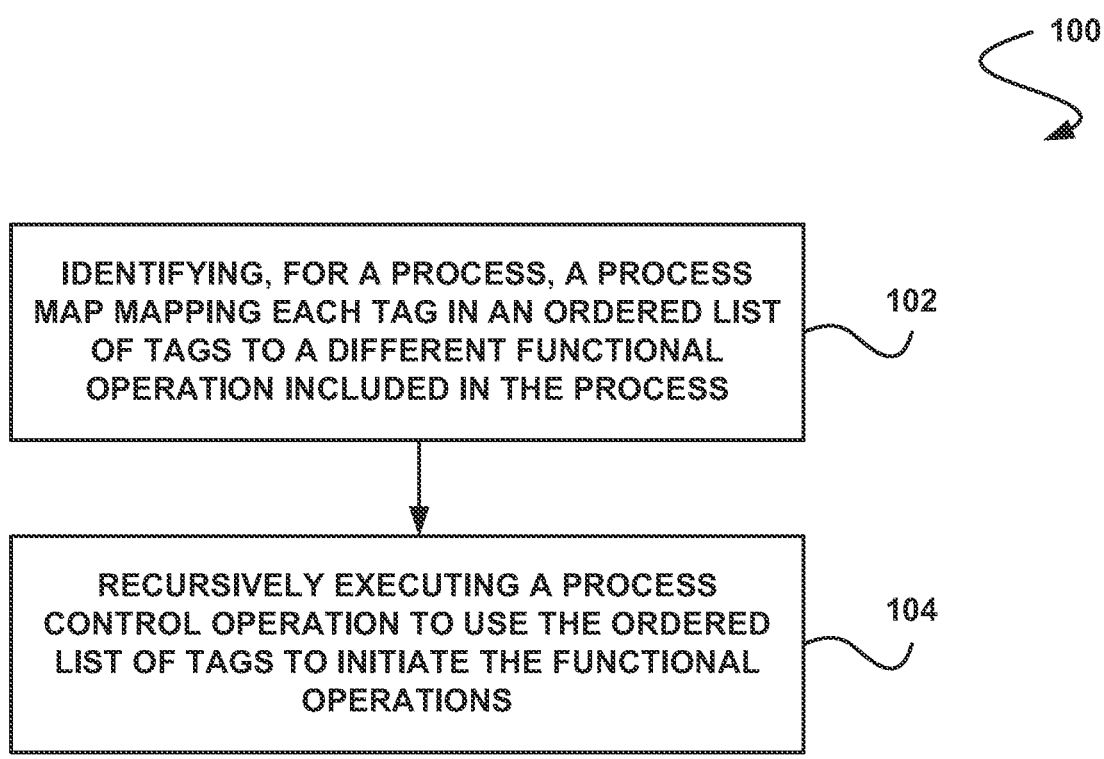
FIG. 1 illustrates a method for controlling a process using a process map in accordance with an embodiment.

FIG. 1 illustrates a method 100 for controlling a process using a process map in accordance with an embodiment. As shown in operation 102, for a process, a process map is identified that maps each tag in an ordered list of tags to a different functional operation included in the process. In the context of the present description, the process includes the execution of any collection of functional operations (e.g. functions, methods, etc.).

In one embodiment, the functional operations may be asynchronous with respect to the process. For example, the functional operations may not necessarily be dependent on one another. Of course, in another embodiment, the functional operations may be synchronous (i.e. sequential) with respect to the process. In particular, at least one of the functional operations may be dependent on another one of the functional operations (e.g. by receiving as input an output of one of the other functional operations, by only functioning properly upon completion of one of the other functional operations, etc.).

Moreover, as noted above, a process map is identified for the process, where the process map maps each tag in an ordered list of tags to a different one of the functional operations included in the process. To this end, the process map may be created for the process (e.g. by a user), including for example to define the process, such that the process map is identified for the process based on the creation of the process map. The definition may be formed with reference to the functional operations included therein, and further with reference to the ordering of such functional operations by virtue of the ordered list of tags mapped to the functional operations.

In one embodiment, the tags that are mapped to the functional operations may each be a different string. Each string may be any arbitrary sequence of characters, since the tags themselves may not necessarily have any preconfigured meaning. For example, the strings may be used only for their mapping to the functional operations, further in accordance with the ordering in which they are listed, as set forth in more detail below.

Furthermore, as shown in operation 104, a process control operation is recursively executed to use the ordered list of tags to initiate the functional operations. In the present description, the process control operation may be any operation (e.g. function, method, etc.) that is capable of initiating the functional operations using the process map. Thus, the process control operation may be an operation that is not necessarily a function making up the process, but which is a function used for executing the functional operations to perform the process.

Moreover, the process control operation may be recursively executed by repeatedly calling the process control operation. Specifically, each call to the process control operation may result in the process control operation initiating a different one of the functional operations. Of course, as an option, the process control operation may also be called in a manner that results in the process control operation terminating the process or performing some other default action associated with an error in the process.

In one embodiment, a different one of the tags may be passed into the process control operation for each of a plurality of calls to the process control operation. For example, when initiating a functional operation by the process control operation, the functional operations may be tagged by the process control operation with the tag to which the functional operation is mapped. When the functional operation completes, it may return the tag to the process control operation as an indication that it has completed. The functional operation may be tagged in any desired manner, such as by passing the tag into the functional operation as an argument.

When the process control operation is called with one of the tags passed into it (e.g. from the functional operation to which it is mapped), the process control operation may then use the process may to determine a next tag to the passed in tag in the ordered list of tags. In this way, the process control operation may be recursively called (e.g. by the functional operations) until a last tag in the ordered list of tags is passed into the process control operation, or optionally an error or timeout is encountered by the process control operation.

Just by way of example, the process control operation may be recursively called by: (a) calling the process control operation with one of the tags passed into the process control operation; (b) determining from the process map, by the process control operation, a next tag in the ordered list of tags; (c) calling the functional operation mapped to the next tag with the first next passed in to the first functional operation; (d) receiving the next tag as output of the functional operation to indicate completion of execution of the functional operation; and (e) repeating (a)-(d) with the output next tag passed into the process control operation.

By initiating the functional operations in accordance with the process map, using the process control operation, the execution of the process may be controlled by a method that is independent of the functional operations included in the process, namely by the process control operation as described above. This may allow the process to be executed in a manner that is based on the sequence of functional operations defined by the process map, such that the actual functional operations of the process may not necessarily be required to be programmed to follow a particular sequence, and may further not necessarily be required to listen for one another to determined when they should execute.

Still yet, use of the process control operation with reference to the process may improve the ease by which the sequence of operations may be changed. For example, the process may be automatically modified by modifying the process map, which may further enable the process to be modified without modifying the functional operations. In one embodiment, the ordered list of tags and associated functional operations may be re-arranged within the process map such that the functional operations may follow a different sequence when initiated by the process control operation. In another embodiment, any of the tags and associated functional operations may be removed from the process map for removing functional operations from the process and/or any other tags and associated functional operations may be added to the process map for adding functional operations to the process. In this way, the process may be modifiable by only changing the process map.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
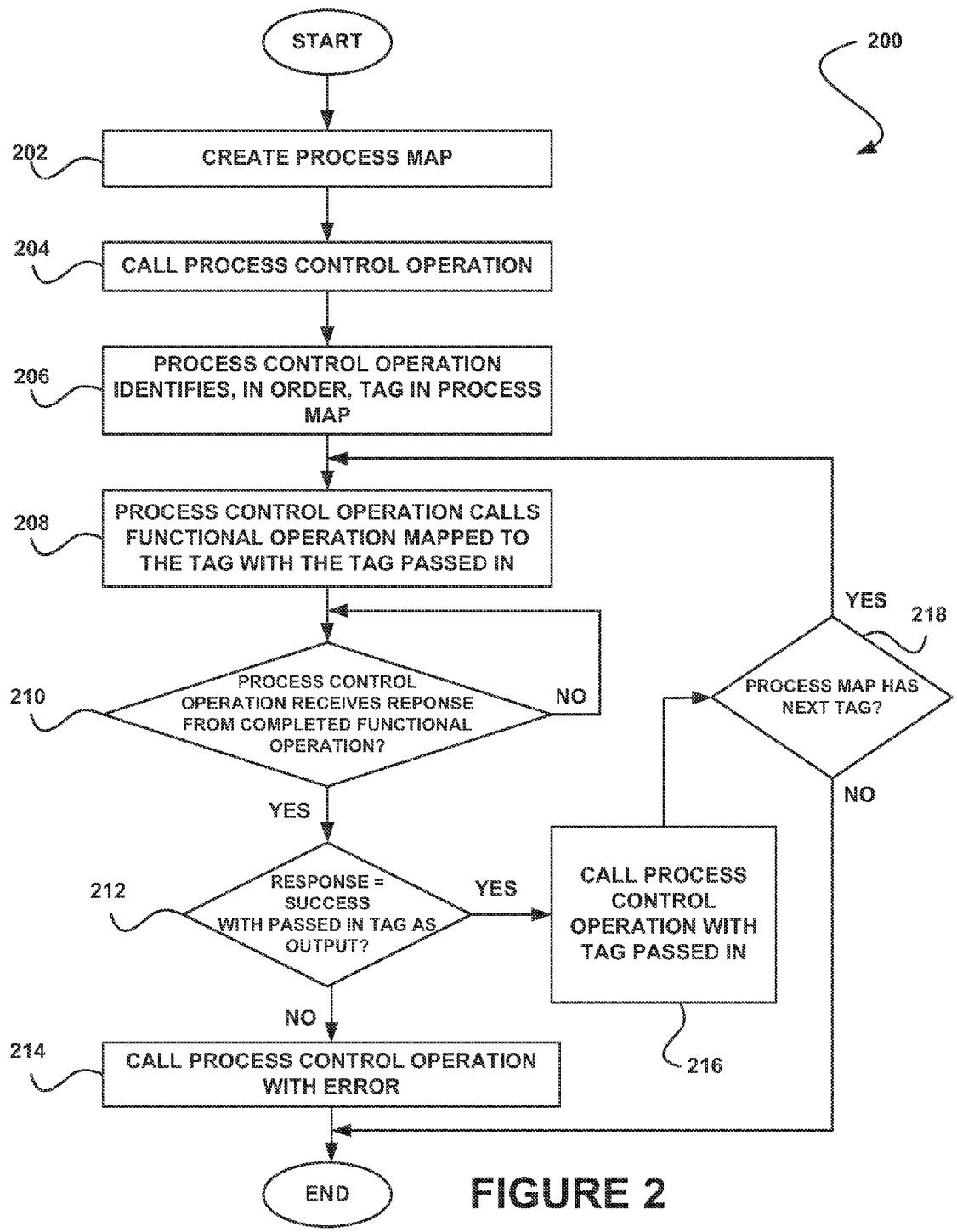
FIG. 2 illustrates a method for recursively calling a process control operation to control a process using a process map, in accordance with an embodiment.

FIG. 2 illustrates a method 200 for recursively calling a process control operation to control a process using a process map, in accordance with an embodiment. As an option, the present method 200 may be carried out in the context of the functionality and architecture of FIG. 1. Of course, however, the method 200 may be carried out in any desired environment. It should also be noted that the aforementioned definitions may apply during the present description.

As shown in decision 202, a process map is created. In the present embodiment, the process map may be any ordered list of tags, with each tag mapped to a different functional operation. Thus, the process map may define a process involving the functional operations. In one embodiment, the process map may be created by a user (e.g. using tools of a user interface, by programming the process map, etc.).

Additionally, a process control operation is called, as shown in operation 204. The process control operation may be called without one of the tags passed in, to initiate execution of the process. The process control operation then identifies, in order, a tag in the process map, as shown in operation 206. In particular, the process control operation may determine from the process map a first tag in the ordered list of tags.

Further, as shown in operation 208, the process control operation calls the functional operation mapped to the tag with the tag passed in. Since in operation 204 the first tag is determined, the first functional operation mapped to the first tag may be called with the first tag passed in to the first functional operation. In this way, the called functional operation may be initiated.

It is then determined in decision 210 whether the process control operation receives a response from a completed functional operation. In particular, the called functional operation may operate to return the passed in tag to the process control operation upon completion (e.g. as output, a return value, etc.). Such tag may be returned by being passed into the process control operation. Thus, in the context of the first functional operation being called with the first tag passed into it, the first tag may be received by the process control operation as output of the first functional operation to indicate completion of execution of the first functional operation.

If it is determined that the process control operation does not receive a response from the completed functional operation, thus indicating that the called functional operation has not completed, the method 200 continues to wait for the process control operation to receive such a response. It should be noted that the process control operation may not necessarily be listening for the response from the completed functional operation, as noted in more detail below.

While not shown, it should be noted that the process control operation may include a timeout. For example, the timeout may be used by the process control operation to terminate the process. As an option, if the process control operation does not receive a response from the completed functional operation within a preconfigured amount of time, the process control operation may time out, and the execution of the process control operation, and accordingly the process, may terminate.

Once it is determined that the process control operation receives a response from the completed functional operation, it is determined in decision 212 whether the response indicates success with the passed in tag as output. For example, the called functional operation may indicate that it has successfully completed by outputting the tag that was passed into it.

If it is determined that the response does not indicate success with the passed in tag as output, the process control operation is called with an error. Note operation 214. For example, the called functional operation may call the process control operation with the error passed into the process control operation. This may allow the process control operation to react based on the error, such as by terminating itself, and accordingly the process, or by performing any other action predefined in the process control operation for the error.

Optionally, such error may be received from a fault handler associated with the called functional operation. For example, the fault handler may report an error to the process control operation when calling the process control operation, and the process control operation may performs a preconfigured action upon receiving the error from the fault handler. In this way, the process control operation may be capable of being called by a fault handler of each of the functional operations when an error within the functional operation occurs.

As also shown, if it is determined that the response indicates success with the passed in tag as output, the process control operation is called with the output tag passed in. Note operation 216. Thus, whether or not the response from the called functional operation indicates a successful completion of the called functional operation, the process control operation may be called to act accordingly. In this way, the called functional operation may not necessarily be required to listen for output of various functional operations of the process, but instead may be event-driven such that the process control operation may be called by the various functional operations.

The process control operation then determines in decision 218 whether the process map has, in the ordered list of tags, a next tag to the passed in tag. If it is determined that the process map has, in the ordered list of tags, a next tag to the passed in tag, the method 200 continues to operation 208 where the process control operation calls the functional operation mapped to such next tag with that same next tag passed in. In this way, the process control operation is recursively called for each next tag in the process map. Once it is determined that the process map does not have, in the ordered list of tags, a next tag to the passed in tag, the method 200 terminates.

Figure 3A:
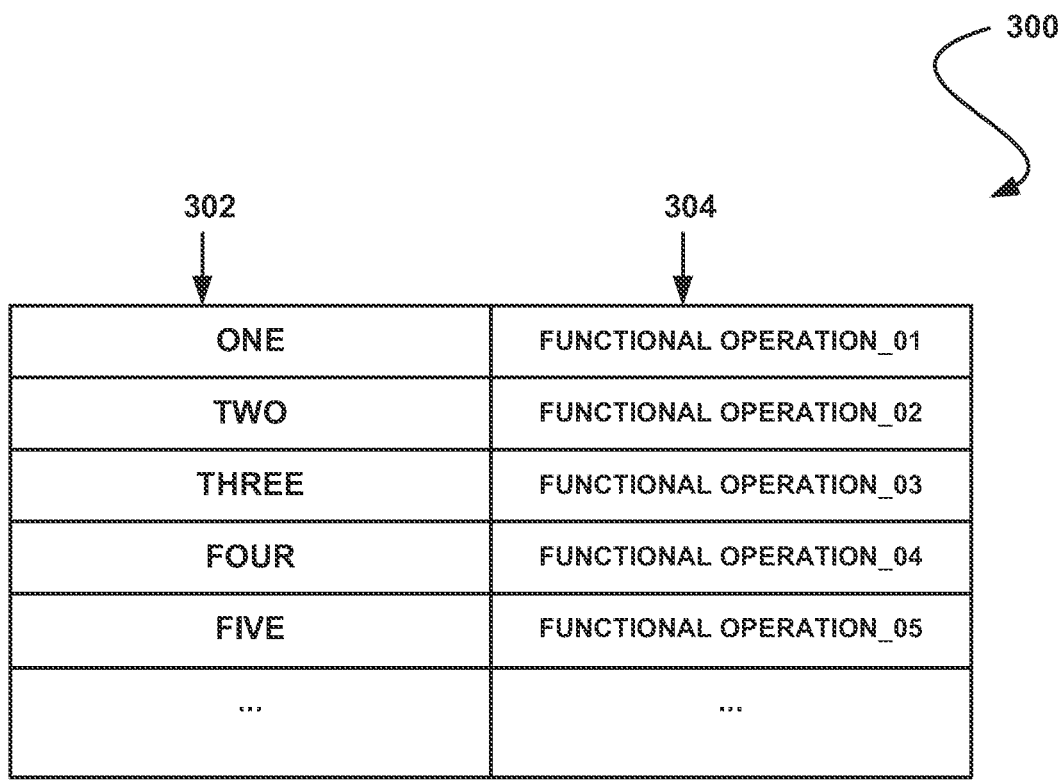
FIG. 3A illustrates an exemplary process map, in accordance with an embodiment.

FIG. 3A illustrates an exemplary process map 300, in accordance with an embodiment. As an option, the present process map 300 may be implemented in the context of the functionality and architecture of FIGS. 1-2. Of course, however, the process map 300 may be implemented in any desired environment. Again, it should also be noted that the aforementioned definitions may apply during the present description.

As shown, the process map 300 includes an ordered list of tags 302. In addition, each tag 302 is mapped to a different functional operation 304. The tags 302 may be any arbitrary string, such as "One," "Two," "Three," etc., as shown. In particular, the tags 302 themselves may not necessarily have any preconfigured meaning. However, the ordering of the tags 302 may be used to define the order of execution of the functional operations 304 in a process defined by the process map 300.

Figure 3B:
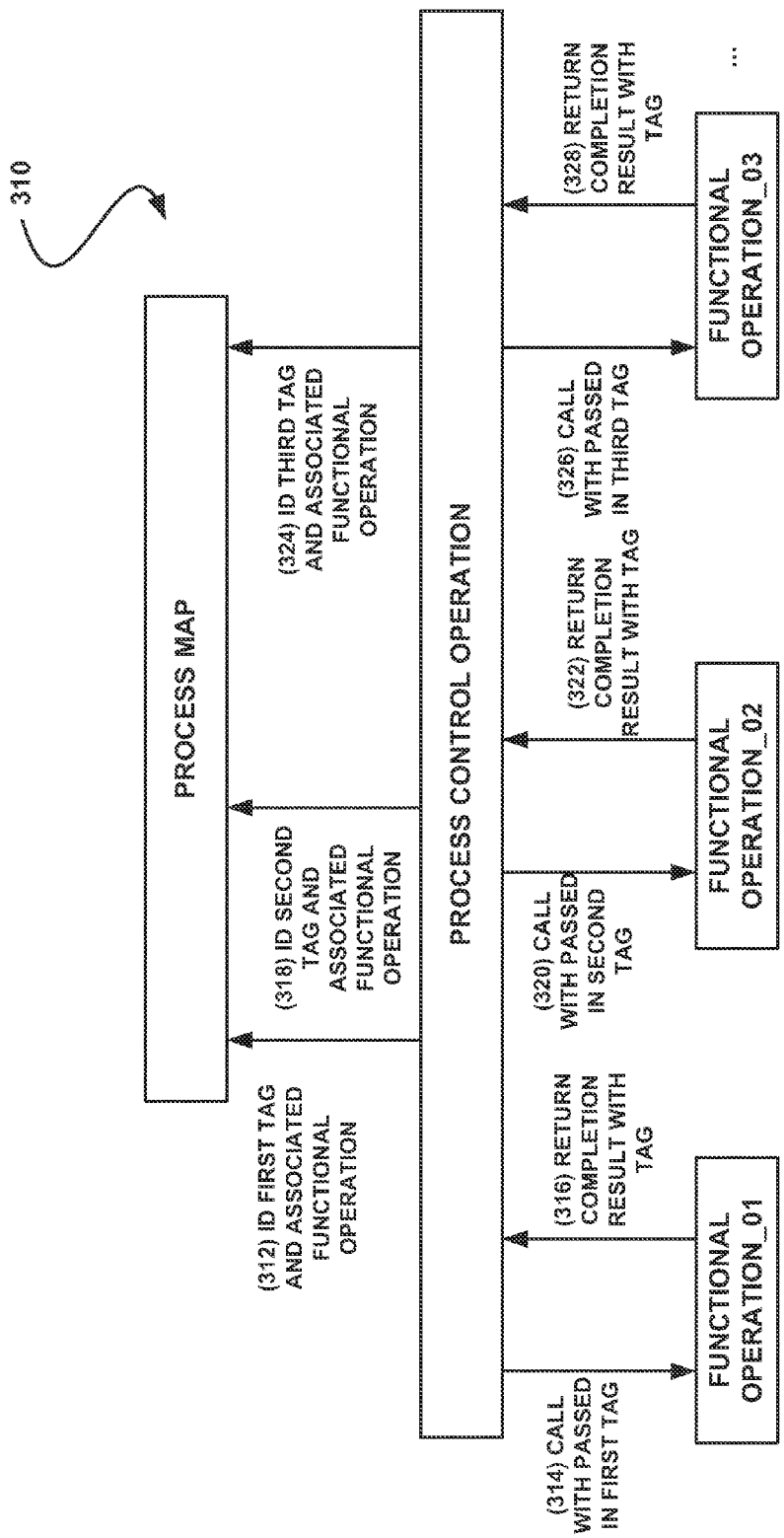
FIG. 3B illustrates the communication system among a process control operation and multiple functional operations of a process which based on a process map in accordance with an embodiment.

FIG. 3B illustrates the communication system 310 among a process control operation and multiple functional operations of a process which based on a process map in accordance with an embodiment. As an option, the communication system 310 may be implemented in the context of the functionality and architecture of FIGS. 1-3B. Of course, however, the communication system 310 may be implemented in any desired environment. Yet again, it should also be noted that the aforementioned definitions may apply during the present description.

As shown, a process control operation is in communication with a process map (300) and each of a plurality of functional operations (304) included in the process map (300). Initially, in operation 312, the process control operation is called and identifies a first tag (302) and associated first functional operation (304) in the process map (300). Then, in operation 314, the process control operation calls the first functional operation (304) with the first tag (302) passed in. When the first functional operation (304) completes execution, it returns a completion result with the first tag (302) to the process control operation. Note operation 316.

In operation 318, the process control operation uses the first tag (302) to determine a second tag (302) and associated second functional operation (304) in the process map (300). Then, in operation 320, the process control operation calls the second functional operation (304) with the second tag (302) passed in. When the second functional operation (304) completes execution, it returns a completion result with the second tag (302) to the process control operation. Note operation 322.

In operation 324, the process control operation uses the second tag (302) to determine a third tag (302) and associated third functional operation (304) in the process map (300). Then, in operation 326, the process control operation calls the third functional operation (304) with the third tag (302) passed in. When the third functional operation (304) completes execution, it returns a completion result with the third tag (302) to the process control operation. Note operation 328.

In this manner, the process control operation may be recursively called by the functional operations (304) until each of the functional operations (304) in the process map (300) has been called. Once the process control operation receives an indication that the last functional operations (304) in the process map (300) completes execution, the process control operation may terminate. Of course, if any of the functional operations (304), or fault handlers associated therewith, return an error to the process control operation instead of a tag, the process control operation may terminate. In addition, if any of the functional operations (304) fail to return a tag to the process control operation within a predetermined amount of time, a timeout of the process control operation may occur and the process control operation may terminate.

System Overview

Figure 4:
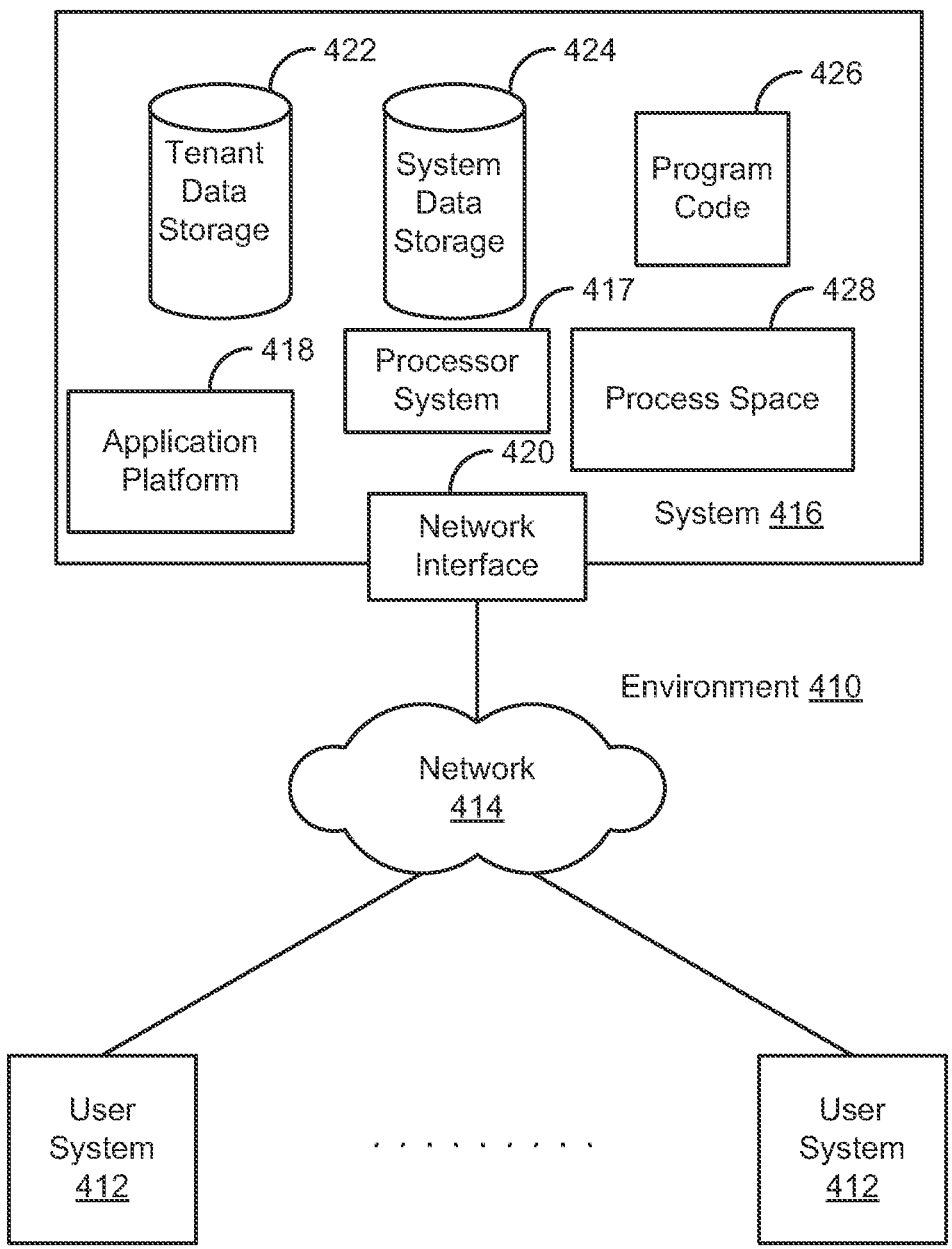
FIG. 4 illustrates a block diagram of an example of an environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an lintel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also he stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers :located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
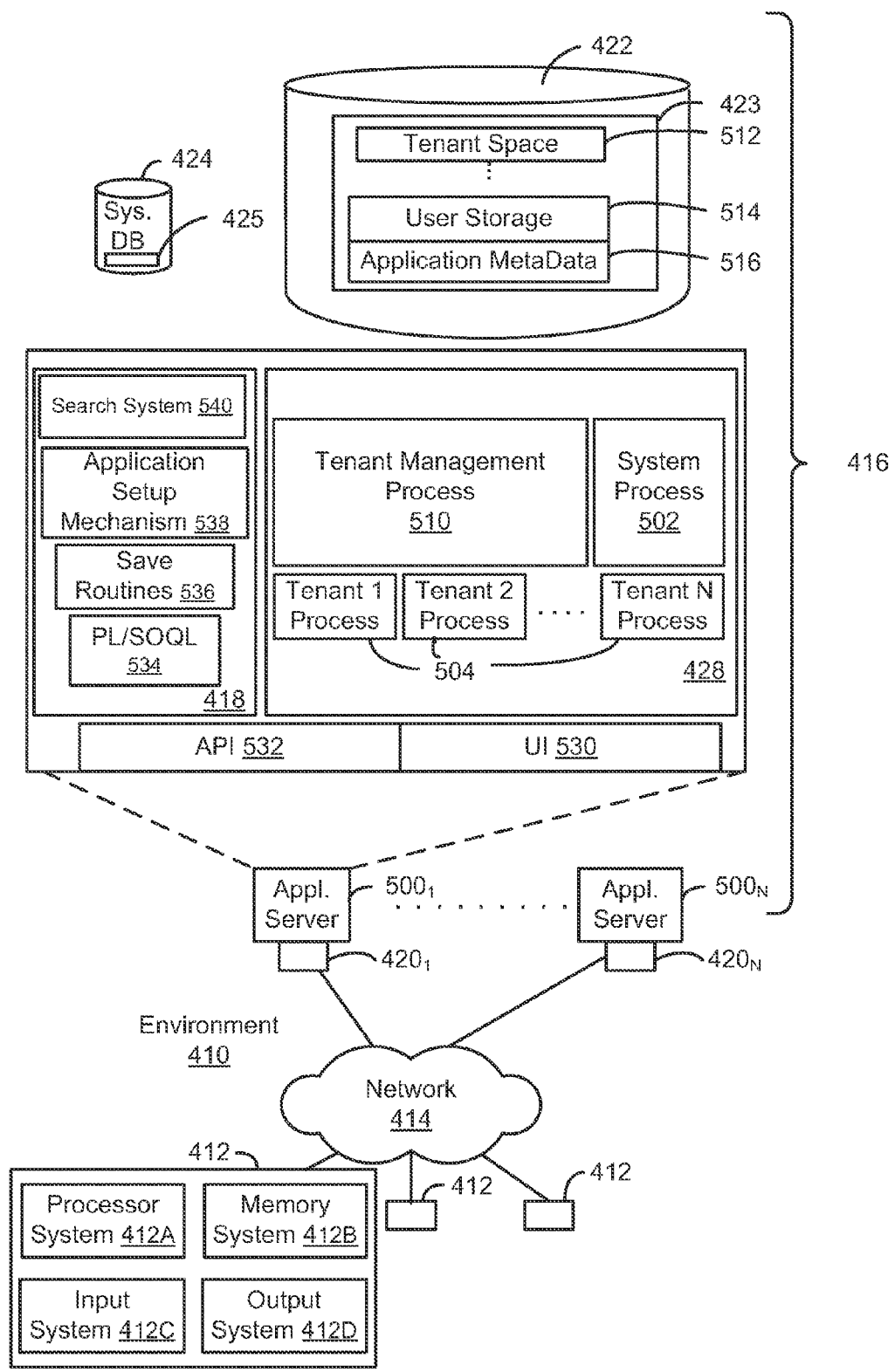
FIG. 5 illustrates a block diagram of an embodiment of elements of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network. 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Pat. No. 7,730,478, entitled "METHOD AND SYSTEM FOR ALLOWING ACCESS TO DEVELOPED APPLICATIONS VIA A MULTI-TENANT ON-DEMAND DATABASE SERVICE," issued Jun. 1, 2010 to Craig Weissman, hereby incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "CUSTOM ENTITIES AND FIELDS IN A MULTI-TENANT DATABASE SYSTEM", issued Aug. 27, 2010 to Craig Weissman, and hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed by a computer to implement a method comprising:
    storing, in memory, a process map that defines a process, the process map including:
    an ordered list of tags, and
    a mapping of each tag in the ordered list of tags to a functional operation;
    performing, by a computer processor, the process by recursively executing a process control operation to use the ordered list of tags to initiate the functional operations, including the computer processor:
    (a) calling the process control operation to initiate execution of the process control operation,
    (b) reading from the process map, by the process control operation, an initial identified tag in the ordered list of tags,
    (c) reading from the process map the functional operation mapped to the identified tag,
    (d) calling, by the process control operation, the identified functional operation with the identified tag passed in to initiate execution of the identified functional operation with the identified tag passed in, wherein the identified functional operation is configured to call the process control operation upon completion,
    (e) receiving from the called functional operation, once completed, a call to the process control operation with the identified tag passed in,
    (f) determining from the process map, by the process control operation, whether a subsequent identified tag exists in the ordered list of tags,
    for each subsequent identified tag in the ordered list of tags, repeating (c)-(f), and when it is determined that a subsequent tag does not exist in the ordered list of tags, terminating the process.

2. The computer program product of claim 1, wherein the functional operations are asynchronous.

3. The computer program product of claim 1, wherein the functional operations are synchronous.

4. The computer program product of claim 1, wherein the tags are each a different string.

5. The computer program product of claim 1, wherein in (f) the process control operation uses the process map to determine whether the subsequent identified tag to the passed in tag exists in the ordered list of tags.

6. The computer program product of claim 1, wherein the process map is created by a user.

7. The computer program product of claim 1, wherein the process is automatically modified by modifying the process map.

8. The computer program product of claim 7, wherein modifying the process by modifying the process map enables the process to be modified without modifying the functional operations.

9. The computer program product of claim 1, wherein the process control operation includes a timeout.

10. The computer program product of claim 9, wherein the timeout is used by the process control operation to terminate the process.

11. The computer program product of claim 1, wherein the process control operation is capable of being called by a fault handler of each of the functional operations.

12. The computer program product of claim 11, wherein the fault handler reports an error to the process control operation when calling the process control operation.

13. The computer program product of claim 12, wherein the process control operation performs a preconfigured action upon receiving the error from the fault handler.

14. A method, comprising:
   storing, in memory, a process map that defines a process, the process map including:
      an ordered list of tags, and
      a mapping of each tag in the ordered list of tags to a functional operation;
   performing, by a computer processor, the process by recursively executing a process control operation to use the ordered list of tags to initiate the functional operations, including the computer processor:
      (a) calling the process control operation to initiate execution of the process control operation,
      (b) reading from the process map, by the process control operation, an initial tag in the ordered list of tags,
      (c) reading from the process map the functional operation mapped to the identified tag,
      (d) calling, by the process control operation, the identified functional operation with the identified tag passed in to initiate execution of the identified functional operation with the identified tag passed in, wherein the identified functional operation is configured to call the process control operation upon completion,
      (e) receiving from the called functional operation, once completed, a call to the process control operation with the identified tag passed in,
      (f) determining from the process map, by the process control operation, whether a subsequent identified tag exists in the ordered list of tags,
   for each subsequent identified tag in the ordered list of tags, repeating (c)-(f), and when it is determined that a subsequent tag does not exist in the ordered list of tags, terminating the process.

15. An apparatus, comprising:
   a processor for:
   storing, in memory, a process map that defines a process, the process map including:
      an ordered list of tags, and
      a mapping of each tag in the ordered list of tags to a functional operation;
   performing, by a computer processor, the process by recursively executing a process control operation to use the ordered list of tags to initiate the functional operations, including the computer processor:
      (a) calling the process control operation to initiate execution of the process control operation,
      (b) reading from the process map, by the process control operation, an initial tag in the ordered list of tags,
      (c) reading from the process map the functional operation mapped to the identified tag,
      (d) calling, by the process control operation, the identified functional operation with the identified tag passed in to initiate execution of the identified functional operation with the identified tag passed in, wherein the identified functional operation is configured to call the process control operation upon completion,
      (e) receiving from the called functional operation, once completed, a call to the process control operation with the identified tag passed in,
      (f) determining from the process map, by the process control operation, whether a subsequent identified tag exists in the ordered list of tags,
   for each subsequent identified tag in the ordered list of tags, repeating (c)-(f), and when it is determined that a subsequent tag does not exist in the ordered list of tags, terminating the process.

16. A method for transmitting code, comprising:
   transmitting code for storing, in memory, a process map that defines a process, the process map including:
      an ordered list of tags, and
      a mapping of each tag in the ordered list of tags to a functional operation;
   transmitting code for performing, by a computer processor, the process by recursively executing a process control operation to use the ordered list of tags to initiate the functional operations, including the computer processor:
      (a) calling the process control operation to initiate execution of the process control operation,
      (b) reading from the process map, by the process control operation, an initial tag in the ordered list of tags,
      (c) reading from the process map the functional operation mapped to the identified tag,
      (d) calling, by the process control operation, the identified functional operation with the identified tag passed in to initiate execution of the identified functional operation with the identified tag passed in, wherein the identified functional operation is configured to call the process control operation upon completion,
      (e) receiving from the called functional operation, once completed, a call to the process control operation with the identified tag passed in,
      (f) determining from the process map, by the process control operation, whether a subsequent identified tag exists in the ordered list of tags,
   for each subsequent identified tag in the ordered list of tags, repeating (c)-(f), and when it is determined that a subsequent tag does not exist in the ordered list of tags, terminating the process.

* * * * *